United States Patent [19]

Ignatoweicz

[11] 3,878,925
[45] Apr. 22, 1975

[54] MOUNTING DEVICE FOR MAGNETIC RAIL BRAKES

[75] Inventor: Gustaw Ignatoweicz, Munich, Germany

[73] Assignee: Knorr-Bremse GmbH, Munich, Germany

[22] Filed: Jan. 18, 1974

[21] Appl. No.: 434,680

[30] Foreign Application Priority Data
Jan. 19, 1973 Germany.......................... 2302539

[52] U.S. Cl............................. 188/206 R; 188/265
[51] Int. Cl............................................ F16d 65/02
[58] Field of Search .......... 188/165, 196 M, 196 B, 188/205 R, 206 R; 303/3

[56] References Cited
UNITED STATES PATENTS

| | | | |
|---|---|---|---|
| 1,019,872 | 3/1912 | Williams | 188/196 M |
| 2,096,485 | 10/1937 | Farmer | 188/165 |
| 2,170,244 | 8/1939 | Hull | 188/165 |

*Primary Examiner*—Duane A. Reger
*Attorney, Agent, or Firm*—Edmund M. Jaskiewicz

[57] ABSTRACT

A magnetic rail brake unit is mounted for vertical adjustment on a part of a railway vehicle which supports a pneumatic bellows. The mounting comprises a pair of mutually engaging clamping plates on the magnetic rail brake and vehicle part respectively. There are horizontal interfitting indentations on these mutually facing surfaces and the plates are clamped together along these indentations by bolts which are accessible on the outer surface of the railway vehicle.

4 Claims, 3 Drawing Figures

MOUNTING DEVICE FOR MAGNETIC RAIL BRAKES

The present invention relates to the mounting of a magnetic rail brake on a railway vehicle, more particularly, to an adjustable structure for mounting the rail brake on a part of the vehicle upon which a pneumatic bellows is supported.

Various structures have been proposed to mount magnetic rail brakes on that part of a railway vehicle upon which the pneumatic bellows is supported. In order to provide for vertical adjustment of the magnetic brake such structures have been characterised by a relatively great vertical dimension and required a considerable amount of space. In addition, the structure and arrangement of such a mounting device made servicing of the components a rather difficult operation. In addition, the actual procedure for adjusting vertically the rail brake required considerable time and was difficult to accomplish in order to position the rail brake vertically with any great degree of accuracy.

It is therefore the principal object of the present invention to provide a novel and improved device for adjustably mounting a magnetic rail brake on a part of a railway vehicle supporting a pneumatic bellows.

It is another object of the present invention to provide such a mounting device wherein the magnetic brake can be adjusted vertically by means of a relatively simple operation requiring very little time.

It is a further object of the present invention to provide such a mounting device which is simple in structure and requires a minimum of space.

According to one aspect of the present invention a device for vertically, adjustably mounting a magnetic rail brake on a part of a railway vehicle supporting a pneumatic bellows may comprise a pair of vertical clamping plates with one plate being on the magnetic brake and the other plate on the part of the vehicle supporting the bellows. The mutually facing surfaces of the clamping plates are provided with interfitting horizontal indentations. The plates are clamped together by one or more bolts which are accessible from the outer side of the vehicle so as to simplify the adjusting operation. The bolts extend outwardly beyond a vertical central plane passing through the bellows in the direction of travel of the vehicle. Cooperating vertical guide means are also provided on the mutually facing surfaces of the clamping plates.

Other objects and advantages of the present invention will be apparent upon reference to the accompanying description and taken in conjunction with the following drawings, which are exemplary, wherein.

Proceeding next to the drawings wherein like reference symbols indicate the same parts throughout the various views a specific embodiment of the present invention will be described in detail.

Figure 1:
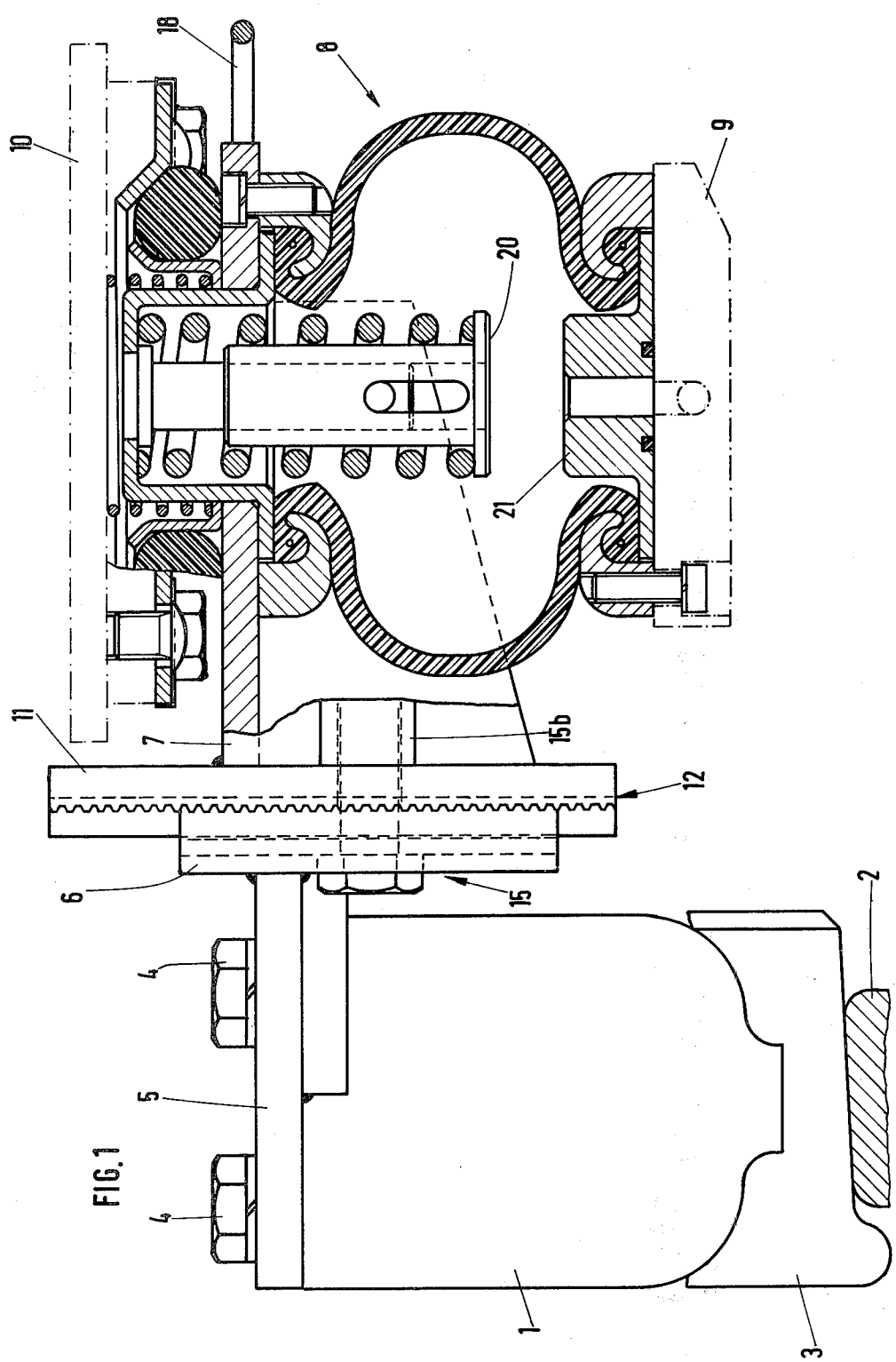
FIG. 1 is a front elevational view of the mounting device of the present invention with the bellows structure being shown in section.

A known conventional magnetic rail brake is shown at 1 in the drawings and this rail brake is attracted by magnetic force against rail 2 for the purpose of braking. A wheel of the railway vehicle from which the magnetic rail brake is mounted is seen at 3.

The magnetic braking unit 1 is suspended by bolts 4 from a supporting plate 5 which extends toward the outer side of the vehicle and has its free end welded to a vertical clamping plate 6.

A bracket type supporting member 7 rests upon a pneumatic annular bellows 8 as seen in FIG. 1. The bellows 8 is mounted in the conventional known manner between a lower flange 9 and a middle flange 10 of the supporting frame of the vehicle. The structural details of the bellows 8 are well known in the art and need not be described in further detail.

Figure 2:
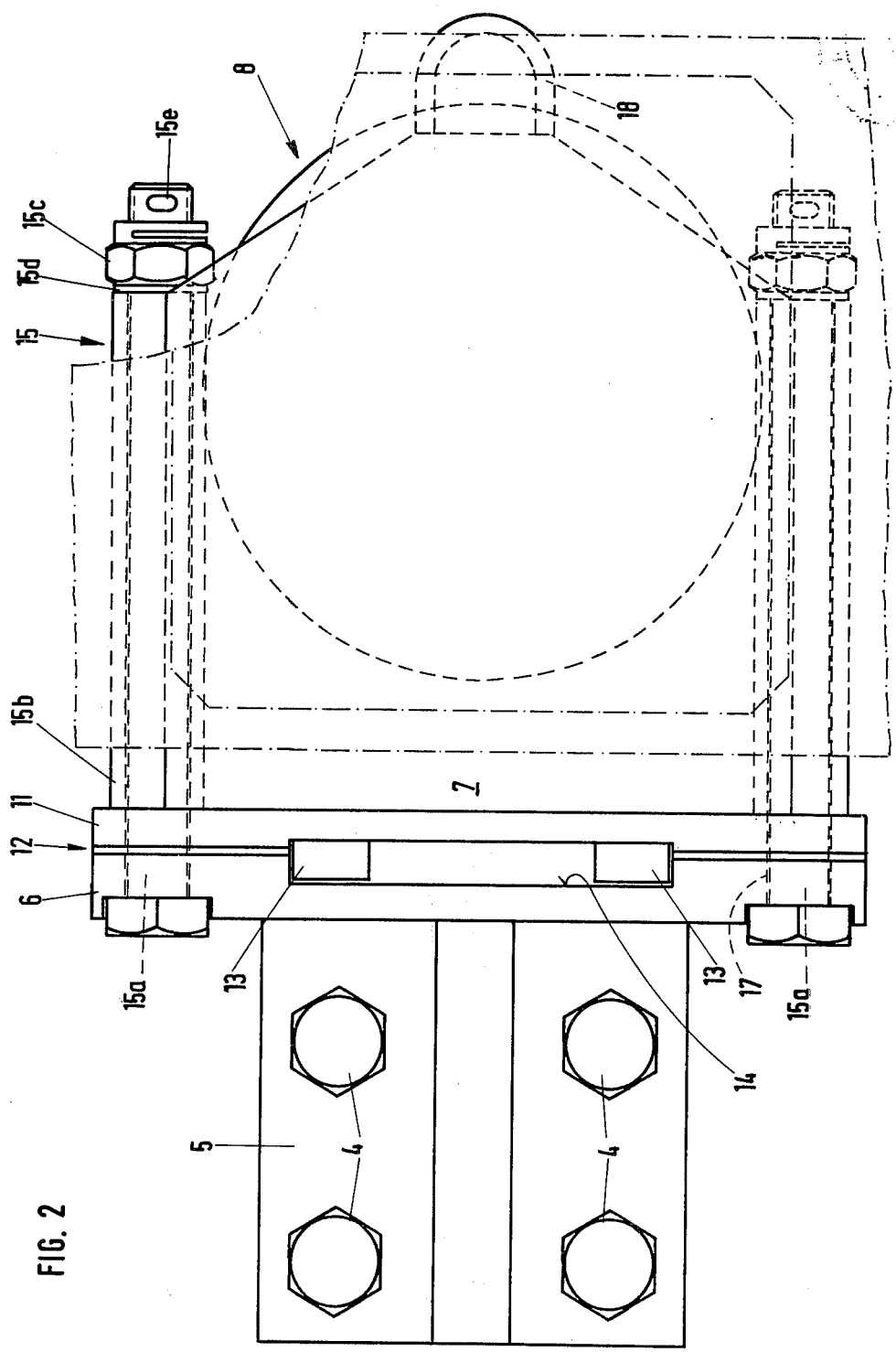
FIG. 2 is a top plan view of the mounting device of FIG. 1.

On the end of the supporting member 7 facing the magnetic supporting structure there is welded a second vertical clamping plate 11. The mutually facing surfaces of clamping plates 6 and 11 are provided with a plurality of horizontal indentations 12 which may be shaped as teeth as illustrated in FIGS. 1 and 2. The clamping plate 11 is further provided with a pair of vertical guide bars 13 which are received in a vertical guide groove 14 formed in the clamping plate 6.

Figure 3:
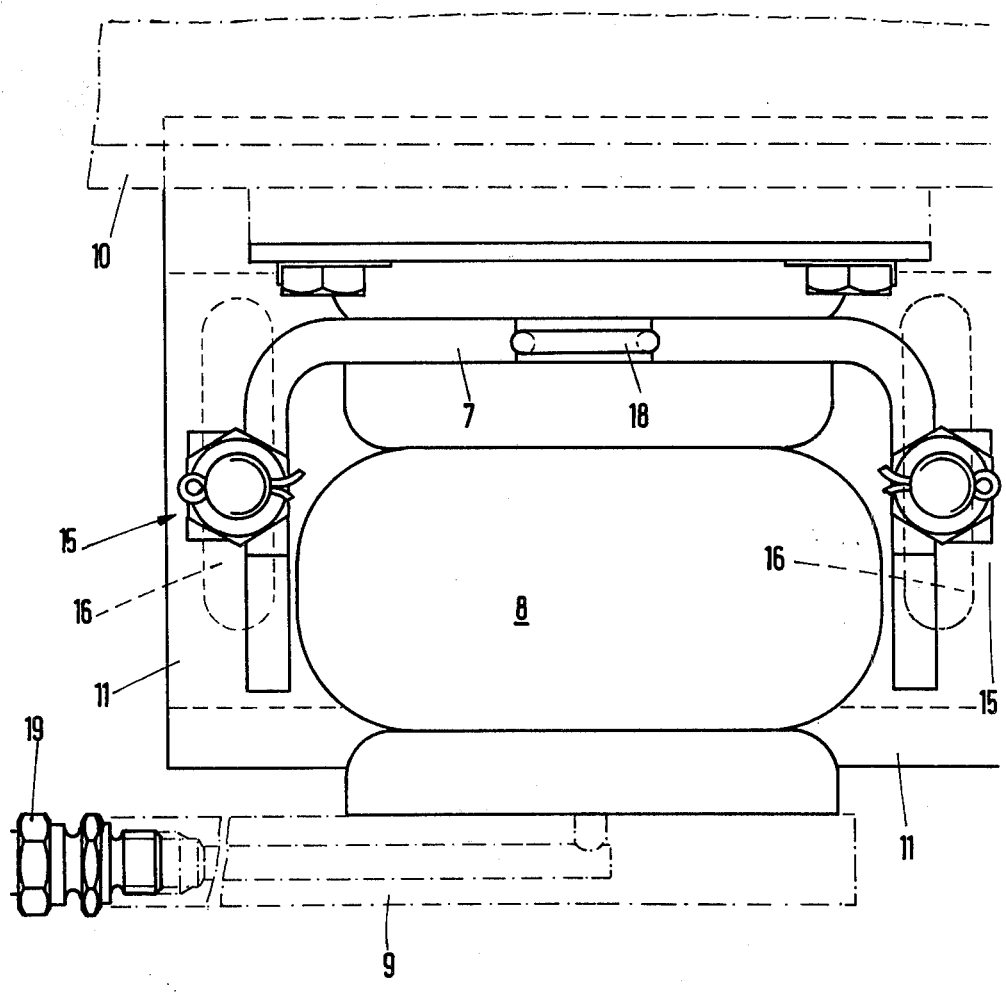
FIG. 3 is an elevational view of the mounting device looking from the right of FIG. 1.

The clamping plates 6 and 11 are clamped together by bolts indicated generally at 15. Each bolt 15 has a threaded shank 15a which passes through a vertically elongated slot 16 (FIG. 3) in the clamping plate 6 and a bore 17 in the clamping plate 11. The threaded shank portion 15a extends toward the outer surface of the vehicle beyond a central vertical longitudinal plane M of the bellows 8. A sleeve 15b is positioned over the shank which projects beyond the clamping plate 11. A nut 15c is threaded on that portion of the end of shank 15a which projects beyond sleeve 15b. A locking washer 15d and a cotter pin 15e retain the nut 15c in position. As is readily apparent from an examination of the structure of FIG. 2, the clamping plates 6 and 11 are clamped together with their respective indentations 12 interfitting in the manner shown in FIG. 1 when the nut 15c is tightened on the shank 15a.

A handle 18 which may be in the form of a loop is attached to the edge of a supporting member 7 which is freely accessible from the outer side of the vehicle.

In operation, the bellows 8 is supplied with compressed air through a connection 19. The introduction of compressed air into the bellows 8 will lift the supporting member 7 and by means of the clamping plate connection 6, 11, 12 the magnet support 5 and thus the magnetic unit 1 will be also lifted.

In order to actuate the magnetic rail brake, the pressure of the compressed air in the bellows 8 is reduced and the bellows will be compressed downwardly because of the weight of the magnetic unit 1 and the components attached thereto. The downward movement of the bellows 8 will be stopped upon the abutment of a spring buffer 20 upon a lower support 21. In this so called "low" position the brake magnet is energized and is attracted toward rail 2 which will cause a further compression of the spring buffer 20.

In this low position, the lower edge of the magnet should be spaced about 8–12 mm from the surface of the rail 2. If this space or clearance is reduced because of wear of the vehicle wheel or the pole pieces or is increased because of improper vertical setting it is then necessary to correct the vertical setting of the magnetic brake unit. This can be accomplished by placing bellows 8 under pressure so that the magnetic unit 1 is raised to the "high" position and positioning spacing blocks under the magnetic brake upon the rail 2. These spacing blocks are designed for such a purpose and have a height which corresponds to the desired distance in the low position, namely, about 8 mm. The pressure of the compressed air within the bellows 8 is then reduced. The clamping bolts 15 are then unloosened by unscrewing the nuts 15c to such an extent that the interfitting indentations 12 on the clamping plates 6 and 11 become disengaged upon a light pull on the handle 18 in the outer direction. While the brake magnet 1 is thus supported on the above mentioned spacing blocks, the supporting member 7 is set automatically in the vertical position required for the proper low position. In this position, the indentations are again engaged by releasing the handle 18 and by clamping the plates 6 and 11 together by tightening the clamping bolts 15. The brake magnet 1 is now located at the desired vertical position.

The ends of the bolts 15 are readily accessible on the outer surface of the railway vehicle so that threading and unthreading of the nuts 15c is greatly facilitated. The use of the indentations provides a fine and precise vertical setting which will be reliably maintained for a long period of operating time.

The clamping plates may be kept rather small in size so that they scarcely project beyond the magnet support in the upper direction. The result is a compact structural unit which has relatively small vertical dimensions.

Not only are the nuts on the ends of the clamping bolts readily accessible but ordinary tools can be used for screwing and unscrewing these nuts for the purpose of carrying out the vertical adjustment of the magnetic unit.

The vertical slide guide structure between the clamping plates prevents tilting of the brake magnetic during vertical adjustment thereof.

It is to be pointed out that the invention as disclosed may be modified, such as by providing continuous and uninterrupted indentations 12 on the clamping plates 6 and 11 but providing some other form of vertical guide structure. Such indentations could be provided in the central portions of the clamping plates and the guide means could be disposed at the edges of the plates.

It will be understood that this invention is susceptible to modification in order to adapt it to different usages and conditions, and accordingly, it is desired to comprehend such modifications within this invention as may fall within the scope of the appended claims.

What is claimed is:

1. A device for vertically adjustably mounting a magnetic rail brake on a part of a railway vehicle supporting a pneumatic bellows, comprising a first vertical clamping plate on the magnetic brake, a second vertical clamping plate on the bellows supporting part, there being interfitting horizontal indentations on the mutually facing surfaces of said clamping plates, and bolt means accessible from the outer side of the vehicle for clamping said plates together along said indentations on the mutually facing surfaces, vertical slide guide means on the mutually facing surfaces of said clamping plates.

2. A device as claimed in claim 1 wherein said bolt means extend outwardly beyond a vertical central plane through said bellows in the direction of travel of the vehicle.

3. A device as claimed in claim 1 wherein one of said clamping plates has vertical guide bars thereon and the other plate has a vertical guide groove receiving said guide bars.

4. A device as claimed in claim 1 and a supporting plate extending laterally outwardly from said first vertical clamping plate and said magnetic brake suspended therefrom.

* * * * *